July 10, 1956
J. R. DE PUY ET AL
2,753,671
MACHINE FOR VACUUM PACKAGING USING
FLEXIBLE SHEET MATERIAL
Filed May 21, 1952
2 Sheets-Sheet 1
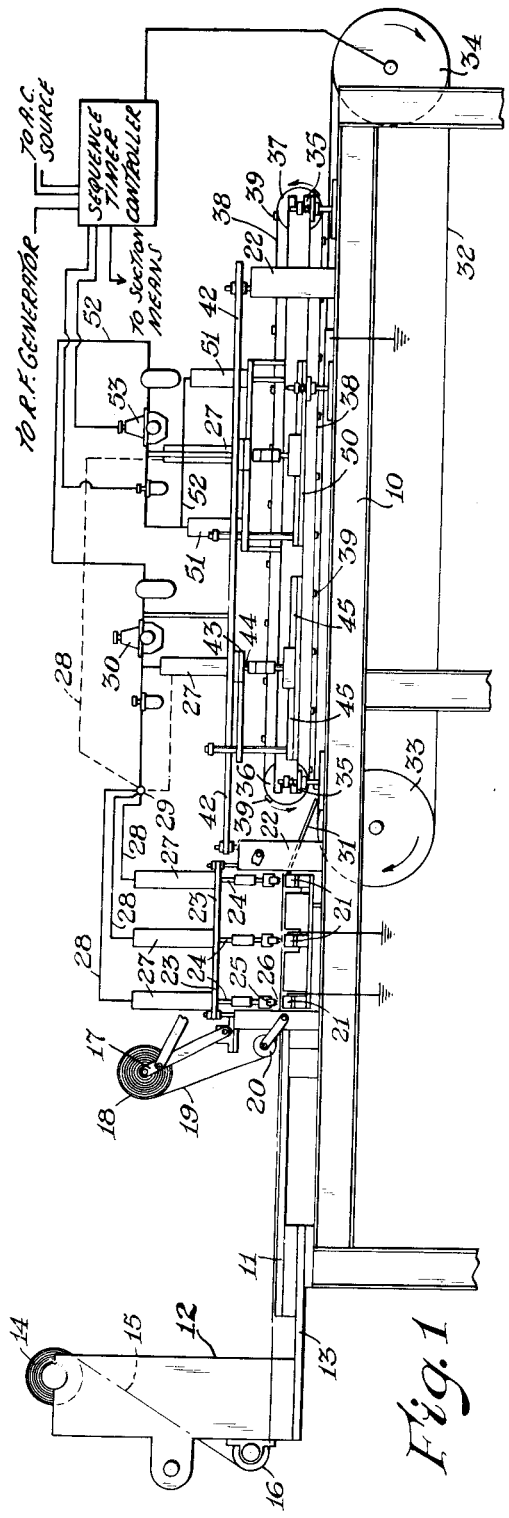
INVENTORS
James R. De Puy
Fred W. Hartman
William C. Jones
Walter A. Klein
BY Griswold & Burdick
ATTORNEYS July 10, 1956 J. R. DE PUY ET AL 2,753,671
MACHINE FOR VACUUM PACKAGING USING
FLEXIBLE SHEET MATERIAL
Filed May 21, 1952 2 Sheets-Sheet 2
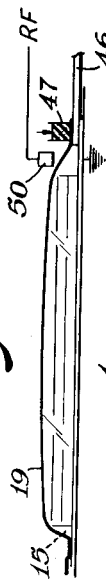
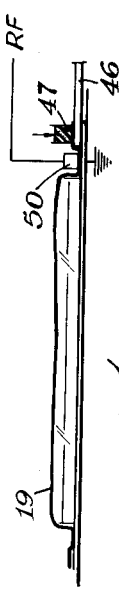
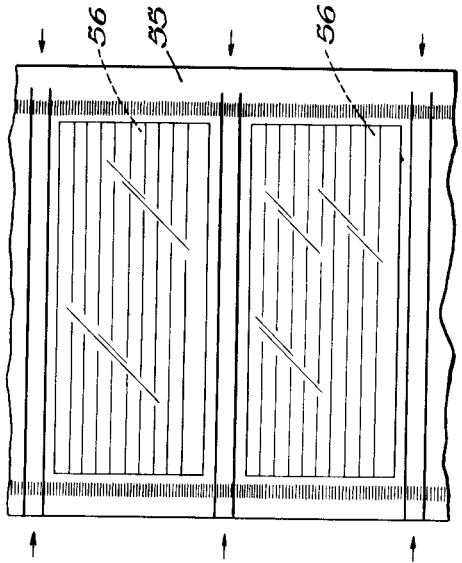
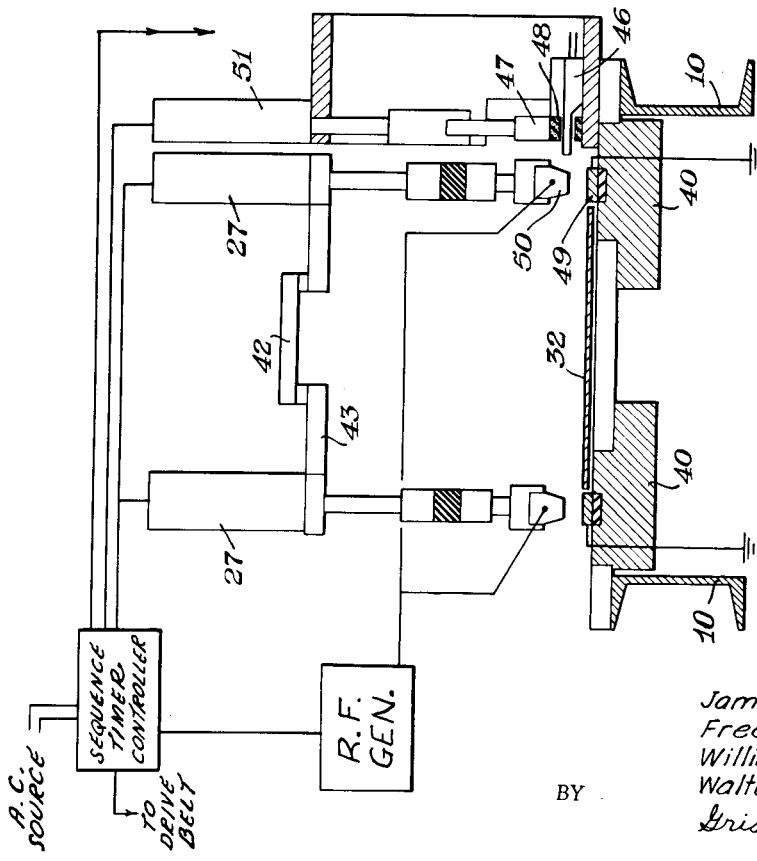
INVENTORS
James R. De Puy
Fred W. Hartman
William C. Jones
Walter A. Klein
BY
Griswold & Burdick
ATTORNEYS

United States Patent Office 2,753,671
Patented July 10, 1956

2,753,671

MACHINE FOR VACUUM PACKAGING USING FLEXIBLE SHEET MATERIAL

James R. De Puy, Fred W. Hartman, William C. Jones, and Walter A. Klein, Midland, Mich., assignors to The Dow Chemical Company, Midland, Mich., a corporation of Delaware Application May 21, 1952, Serial No. 289,142

5 Claims. (Cl. 53—88)

This invention relates to a machine for packaging bacon or other foods or commodities in flexible sheet material of a type which can be sealed by heat or in a radiofrequency field, and for sealing and evacuating the resulting packages. It relates in particular to such a machine which effects in sequence all of the necessary operations and discharges finished packages at regular intervals.

Many foods, including sliced bacon, and other commodities are sealed in moisture-impervious packages to facilitate merchandising and to preserve the moisture content, flavor, "freshness," or other characteristics of the product. The protective effect of the packaging material can be augmented in many cases by exhausting air from the package prior to final sealing, creating the condition popularly referred to as the vacuum-pack.

An improved machine is required to effect in a semi-automatic or fully automatic manner the entire packaging and air-exhausting operation. Such a machine should supply to the loading station a continuous flexible sheet material having at least one surface consisting of a moisture- and air-impervious thermoplastic composition. When the goods to be packaged are placed on a plastic surface of said sheet, the machine should cover the goods with another sheet which may be fused or welded to the first one. The assembly should be advanced by the machine successively to stations where three sides of the package are sealed by fusion of the upper and lower sheets and to a station where air is exhausted from the package and the fourth side is sealed. The machine should discharge the packaged goods after the last mentioned operation, either as individual units or as a connected series of individual packages. The machine, to be practical for commercial operations, should cause the continuous webs of sheet materials to pause at each of the working stations and should perform each of its operations simultaneously on a series of packages at various stages of completion, so that one or more units is being worked on at each station at all times in settled operation. It is the object of this invention to provide such a machine.

The machine of the present invention, whereby the foregoing object is attained, is illustrated in the accompanying drawings, wherein—

Fig. 1 is an elevation of one practical embodiment of the machine;

Fig. 2 is a simplified plan view of the machine, illustrating the several working stations therein;

Fig. 3 is a view in partial section taken along line 3—3 of Fig. 2;

Figs. 4–6 illustrate a series of operations at the final sealing station of the machine; and Fig. 7 is a plan view of a series of finished packages as discharged from the final sealing station.

The machine of the invention is mounted on a supporting frame 10 of convenient height for observation and adjustment by an attendant. At the feed end of the machine, shown at the left in Fig. 1, the frame 10 is surmounted by a flat table II constituting the loading station of the machine. A vertical bracket 12 is mounted over the feed end of the table 11 supported by an extension 13 of frame 10, and carries a supply roll 14 of flexible and thermally sealable sheet material 15 to form the base of the packages to be made in the machine. A guide roll 16 is mounted to the rear of bracket 12 at such a level that its lowest point is tangent to the extended plane of the table 11. The machine is illustrated as being able to accommodate three merchandise units at each station during the packaging operation. Table 11 is of a length sufficient to receive the number of such units for which each subsequent station of the machine is designed. The sheet material 15 is drawn around guide roll 16 and over the table 11, where the material to be packed is placed on the sheet 15. Over the forward, or discharge end of the table 11 there is mounted a bracket 17 which carries a supply roll 18 of a sheet material 19 which is thermally fusible to the upper plastic surface of the bottom sheet 15. The latter will be referred to hereafter as the base sheet, and sheet 19 will be referred to as the cover sheet. The cover sheet 19 is fed from roll 18 around floating guide roll 20 to overlay the base sheet 15 and its supported merchandise as sheet 15 is advanced from the loading station, under roll 20 and toward the next working station in the machine.

Following the path of merchandise through the machine, the next station beyond the loading station is referred to as the cross-sealing station. The base plane in this station is an extension of that in the loading station. Lying in the base plane, and at right angles to the direction of travel through the machine, is a plurality of metal bars 21, equal in number to the number of packages which each station can accommodate, with their centers spaced apart a distance equal to the intended width of the package to be made in the machine. The bars 21 are of a length at least as great as the intended package length. Bars 21 are preferably embedded in rubber, so that pressure applied thereto from above is distributed evenly. When bars 21 are to serve as electrodes for electronic sealing, they are grounded. When bars 21 are to be used for heat sealing, they are internally heated. Mounted on the edges of the machine over frame 10 at each end of the cross-sealing station are transverse brackets 22 which support a longitudinal and centrally disposed frame member 23 spanning the cross-sealing station. The said brackets 22 are used, as well, to support the previously mentioned supply roll 18 and guide roll 20, as illustrated in Fig. 1. Slidably mounted vertically through the horizontal frame member 23, but insulated therefrom, and centered directly over each of the transverse bars 21 is a rod 24 supporting a horizontal metal sealing element 25, which, when used in the preferred electronic sealing operation is electrically connected with a source (as in Fig. 3) of radio frequency oscillations. Each electrode 25 is at least as long as the intended package length but is somewhat shorter than the width of the sheets 15 and 19 from which the packages are made. The lower, working face of each electrode 25 may be provided with two parallel ridges 26, to form a pair of spaced seals in the sheets exposed to the high frequency field between each electrode 25 and its companion grounded bar electrode 21. It is preferred to insert a universal joint of rubber or like material in bar 24 to assure even distribution of pressure between elements 25 and bars 21. The portion of each rod 24 extending above frame member 23 projects as a piston into a pneumatic cylinder 27. When air is supplied to cylinders 27 through lines 28 from header 29, under control of timed valve 30, rods 24 and their dependent electrodes 25 are driven downward into pressure contact with cover sheet 19, pressing the latter firmly against that portion of base sheet 15 which rests on the transverse grounded bars 21. Actuation of the electrical circuit to electrodes 25 at this time forms transverse seals between sheets 15 and 19 along the intended sides of the packages. It is to be understood that elements 25 may be heated rather than serving as electrodes in a radio frequency system. It is also apparent that various mechanical means, other than the pneumatic cylinders 27, may be used for raising and lowering the sealing elements 25.

Extending from the working plane of the cross-sealing station nearly to the lower plane of the next, or bottom-sealing station is an inclined ramp 31. In the plane of the bottom-sealing station is an endless conveyor belt 32 which passes around roll 33 mounted in frame 10 to the rear of the bottom-sealing station and around roll 34 mounted in frame 10 at the discharge end of the machine. Mounted on the side rails of frame 10 near the end of inclined plane 31 and near the discharge end of the machine are brackets 35 supporting transversely disposed rolls 36 and 37 around which passes an endless belt 38 carrying external cleats 39 at intervals equal to the width of the intended packages. Belt 38 is so mounted that its lower, or forward, course lies above the upper and forward course of belt 32 a distance just slightly greater than the thickness of the intended packages. Belts 32 and 38, with the co-operation of cleats 39, serve as positive forwarding means for the merchandise and enclosing sheets 15 and 19 through the machine. Belts 32 and 38, accordingly, are driven simultaneously and at the same linear rate. It is to be understood, of course, that other positive forwarding means, co-operative with belt 32, may be substituted for the illustrated cleated belt 38, and that both belts 32 and 38 may be replaced by other forwarding means. Belt 32 is of a width less than the length of the packages, and is supported laterally by bed rails 40 (shown in Fig. 3) mounted in frame 10. In the bottom-sealing station, there is carried in one of the bed rails 40 a grounded bar electrode 41 disposed longitudinally of the machine in the path of the bottom line of the package. A centrally disposed, longitudinal frame member 42 is supported between transverse brackets 22 and spans the length of the bottom-sealing station and subsequent stations of the machine. A transverse bracket 43 extends laterally from member 42 near the midpoint of the bottom-sealing station. Bracket 43 carries slidably mounted rod 44 and its horizontally disposed longitudinal electrode 45 over and parallel to the bar electrode 41 in the bed rail 40. Electrode 45 is connected electrically to a source (not shown) of radio frequency oscillations, and is moved vertically into and out of contact with the cover sheet 19 by action of its associated pneumatic cylinder 27.

The next, and usually the final station in the machine may be designated as the top-sealing station. The partially completed packages reach this station with the base sheet and cover sheet sealed together across one end and along two sides of the package. The side seals, i. e., those which are in a direction transverse to the continuous sheets, do not extend to the edge of the sheets at the open end of the package. At the top-sealing section, along the side of the machine nearest the open end of the package, is positioned just over the bed rail 40 a horizontally disposed nozzle member 46 with an orifice directed toward the open end of the package. The base sheet 15 of the interconnected but incompleted packages is fed under the nozzle member 46 and the cover sheet 19 of the packages is fed over the top of the nozzle member 46. The nozzle member 46 is connected at its outer end through one valved pipe to a source of compressed air or other gas such as nitrogen or carbon dioxide, and through the same or another valved pipe to a vacuum pump. Mounted vertically over the nozzle member 46 is a hold-down bar 47 faced with sponge rubber 48 or other resilient material, and operated through pneumatic cylinders 51 which are in a different circuit 52 and are controlled by a separately timed valve 53 from the circuit 28 and controls 30 for the electrode-controlling cylinders 27. If desired, a second such hold-down bar (not shown) may be mounted over the sealed bottom end of the package on the opposite side of the machine but in the same station. Disposed longitudinally on bed rail 40 and lying closer to the center of the machine than the nozzle member 46 is a grounded bar electrode 49, and suspended thereover, for operative co-operation therewith is electrode 50, electrically connected with a radio frequency source (Fig. 3) and actuated by a pneumatic cylinder 27, in a branch of air circuit 28, controlled by valve 30.

Beyond the top-sealing station there may be positioned a cut-off device of any standard type to sever the packages from one another along a line intermediate the paired seals produced by ridges 26 on electrodes 25 at the cross-sealing station. When a single broad seal is made between successive packages, the packages are separated by cutting through the center line of such a seal.

The effective working length of each of the several stations is the same, or it is such that the same number of packages is worked on at each station. The distance between effective working points in successive stations along the machine is evenly divisible by the width of the package to be produced so that, when a group of finished packages is forwarded from the top-sealing station toward the discharge point, each of the three sealing stations becomes filled to capacity with unfinished packages, each of which is found to be positioned properly for the operation to be performed at its new station.

In operation, base sheet 15 is fed through the machine, as is cover sheet 19, while electrodes 25, 45 and 50 are in raised position and while belts 32 and 38 are stationary. Merchandise units, equal in number to the capacity of each station of the machine are placed on the base sheet at the loading station. They are then drawn forward with the base sheet until the first unit is positioned between the last two electrodes 25 in the cross-sealing station. Forward movement is interrupted and electrodes 25 are lowered into pressure contact with sheet 19. The radio frequency generator is turned on momentarily, and sheets 15 and 19 become sealed together along the pressure lines between ridges 26 of electrodes 25 and grounded bar electrodes 21. At the same time, more merchandise units are placed on sheet 15 at the loading station. Electrodes 25 are raised and the assembly is drawn forward through the machine until the first unsealed edge of one of the package units is under the last electrode 25 in the series. The prior operations are repeated. When enough such units have passed in this manner through the cross-sealing station so that the bottom-sealing section is filled with partially completed packages, the bottom-sealing electrode 45 is lowered into pressure relationship with sheet 19 at the same time as electrodes 25 are lowered to seal packages newly introduced to the cross-sealing station. The radio frequency source then activates electrodes 25 and 45 simultaneously, and additional merchandise units are placed on base sheet 15 in the loading station. The incomplete package units are advanced stepwise in like manner until the top-sealing station is full of such units. In this station, base sheet 15 is fed beneath and cover sheet 19 is fed over the nozzle member 46. Hold-down bar 47 is lowered into pressure contact with sheet 19, holding it against nozzle member 46 and pressing the latter against base sheet 15 and bed rail 40. Before top-sealing electrode 50 is brought down into operating position, air is evacuated from the package through nozzle 46, preferably after first inflating the package with air or an inert gas admitted through that nozzle to lift cover sheet 19 temporarily out of contact with the merchandise to assure clear channels for exhausting air from the package. Because of the clinging tendencies of some plastic sheets, this is often essential to prevent entrapment of air in pockets sealed off from the nozzle by the clinging film. After evacuation, if desired, the package may be back-filled with an inert gas or with a preservative gas, or, in appropriate cases with a ripening agent, as is conventional in the packaging art. The evacuation step, and any associated back-filling operation, is completed in a very brief instant, and the top sealing electrode is lowered into pressure contact with sheet 19 and is actuated to seal the package at the same time that electrodes 25 and 45 are lowered and actuated. The continuous strip 55 of finished packages 56 is withdrawn from the machine and the units are separated as desired, along the lines noted by arrows in Fig. 7.

Once the machine has been filled, its operation is subject to automatic control by any of several well-known sequence timers. Operation is intermittent or stepwise. While the electrodes 25, 45 and 50 are raised, belt 32 and cleated belt 38 advance the package units a fixed distance, and stop when each partially finished package reaches the station adapted to perform the next required operation. When belts 32 and 38 stop, electrodes 25, 45 and 50 remain in a raised position until hold-down bar 47 is lowered and packages in the top-sealing station are evacuated. Thereupon, electrodes 25, 45 and 50 are lowered into operating position and the radio frequency generator is turned on for a time known to be sufficient to seal the opposed plastic faces of sheets 15 and 19. In the meantime, merchandise units are spaced along base sheet 15 in the loading station, either manually or automatically as may be appropriate. When electrodes 25, 45 and 50 have performed their functions, they are raised out of contact with the package units, and belts 32 and 38 are set in motion through their predetermined forward step. The cycle is repeated continuously. The timer which controls the operation, then, sequentially (1) drives belts 32 and 38 a fixed distance, sufficient to supply a fresh load to each station; (2) stops the belts, (3) admits air through valve 53 to pneumatic cylinders 51 to drop hold-down bar 47 into operating position, (4) opens and closes the air valve admitting air to packages in the top-sealing station, if such step is used, (5) opens and closes the vacuum valve to exhaust air from the same packages, (6) opens and closes the valve to admit back-filling gas to the package, if this step is used, (7) admits air through valve 30 to the several pneumatic cylinders 27 to lower the moveable electrodes 25, 45 and 50, (8) turns on the radio frequency generator to actuate electrodes 25, 45 and 50, (9) turns off the radio frequency generator after a fixed interval, (10) releases air from pneumatic cylinders 27 and 51 to cause electrodes 25, 45 and 50 and hold down bar 47 to resume a raised position, and (11) starts to repeat the cycle by actuating again the drive for belts 32 and 38.

Reference has been made to the base sheet 15 and the cover sheet 19 as having at least their opposed faces composed of a thermoplastic material. Either of these sheets may be made wholly of such plastic, or it may be a paper or cellophane sheet coated with the plastic. It is often desirable for the base sheet to be plastic-coated paper, and for the cover sheet to be a transparent or translucent plastic film. The plastic material of both sheets should be of the same or such closely related composition as to permit them to form strong seals, and it is preferred that the plastic material or materials used have a sufficiently high dielectric loss factor to make them susceptible to being heated to a fusion temperature in a radio frequency field. Many plastic sheets and plastic coatings have the required characteristics, including those based on polymeric derivatives of vinyl chloride or vinylidene chloride.

We claim:

1. A machine for packaging merchandise comprising a horizontal loading station at the feed end and in sequence thereafter a cross-sealing station, a bottom-sealing station, a top-sealing station and a discharge station, the distance between effective working points in successive stations being evenly divisible by the width of the package to be produced; several fixed plastic-welding elements comprising metal bars in the base plane of the machine, a plurality of them being disposed transversely across the machine in the cross-sealing station and spaced apart the width of the intended packages, one of said bars being of a length to span several package units being disposed longitudinally of the machine near one side thereof in the bottom-sealing station, and another of said bars being similarly disposed on the opposite side of the machine in the top-sealing station; a plurality of cooperating plastic-welding elements comprising metal bars suspended for vertical reciprocation over, and of a size to mate with each of the said elements in the base plane of the machine; means associated at least with the suspended welding elements to generate a fusion temperature in plastic sheets interposed between mating pairs of said elements; means for lowering the suspended elements into evenly distributed pressure relationship with the said fixed elements and for raising them away from the fixed elements; a nozzle member mounted over the base plane of the machine in the top-sealing station outside of the longitudinal welding element but extending into the area traversed by packages in transit through the machine; a suction means externally connected with said nozzle; means for holding the open mouth of packages in communication with said nozzle; means for supplying a continuous base sheet of packaging material, at least the upper surface of which is of a thermoplastic composition, over the working plane of the machine from the feed end; means for supplying thereover from a point between the loading and the cross-sealing stations a cover sheet of packaging material, at least the lower surface of which is of a thermoplastic composition similar to that of the base sheet; a positive package forwarding means lying in the working plane of the machine and extending at least through the bottom and top-sealing stations and to the discharge station; and a timer controller for sequentially driving the package forwardly means a distance just sufficient to present new work to each station, stopping the motion of said means, actuating the means for holding the open mouths of packages in the top-sealing station in communication with the suction nozzle, actuating the suction means to evacuate the packages, actuating the means for lowering and raising the suspended plastic-welding elements to lower them into pressure contact with the cover sheet, actuating the means for generating a fusion temperature in the so-compressed areas of the cover sheet and contiguous base sheet while said elements are lowered in working position, and, after a brief interval sufficient to seal the cover sheet to the base sheet and before advancing the package forwarding said means another step, actuating the means for lowering and raising the suspended welding elements to lift them out of the path of the work.

2. The machine claimed in claim 1, wherein the fixed plastic-welding elements are grounded electrodes and the suspended plastic-welding elements are electrodes connected with a radio frequency source.

3. The machine claimed in claim 2, wherein the fixed electrodes are each embedded in a rubbery, yieldable base for even distribution of pressure over the faces of the electrodes when in working engagement with their respective suspended electrodes.

4. The machine claimed in claim 1, wherein a fluid pressure means is used for raising and lowering the suspended welding elements.

5. The machine claimed in claim 4, wherein pneumatic cylinders are used for raising and lowering the suspended welding elements.

References Cited in the file of this patent

UNITED STATES PATENTS

| | | |
|---|---|---|
| 2,145,941 | Maxfield | Feb. 7, 1939 |
| 2,200,971 | Sonnenborn et al. | May 14, 1940 |

(Other references on following page)

UNITED STATES PATENTS

| | | |
|---|---|---|
| 2,205,582 | Steimel | June 25, 1940 |
| 2,288,269 | Crandell | June 30, 1942 |
| 2,410,834 | Messmer | Nov. 12, 1946 |
| 2,447,258 | Lobley | Aug. 17, 1948 |
| 2,565,444 | Waters | Aug. 21, 1951 |
| 2,600,216 | Denison | June 10, 1952 |
| 2,639,567 | Murdock | May 26, 1953 |

FOREIGN PATENTS

| | | |
|---|---|---|
| 26,828 of 1913 | Great Britain | Nov. 21, 1913 |